United States Patent
Wang et al.

(10) Patent No.: US 8,215,607 B2
(45) Date of Patent: Jul. 10, 2012

(54) DAMPING DEVICE OF STAY CABLE

(75) Inventors: Zhengxing Wang, Wuhan (CN); Cuicui Guo, Wuhan (CN); Mingxing Zhou, Wuhan (CN); Zhiyang Tong, Wuhan (CN); Guiqiong Hu, Wuhan (CN); Baohui Cheng, Wuhan (CN); Jiwei Zhong, Wuhan (CN); Bo Wang, Wuhan (CN); Jian Zhao, Wuhan (CN); Wu Li, Wuhan (CN)

(73) Assignees: Bridge Science Research Institute Ltd., China Zhongtie Major Bridge Engineering Group, Wuhan (CN); China Railway Major Bridge Engineering Co., Ltd., Wuhan (CN)

( * ) Notice: Subject to any disclaimer, the term of this patent is extended or adjusted under 35 U.S.C. 154(b) by 0 days.

(21) Appl. No.: 13/178,499

(22) Filed: Jul. 8, 2011

(65) Prior Publication Data

US 2012/0006965 A1    Jan. 12, 2012

Related U.S. Application Data

(63) Continuation of application No. PCT/CN2010/077727, filed on Oct. 14, 2010.

(30) Foreign Application Priority Data

Oct. 14, 2009 (CN) .......................... 2009 1 0272400

(51) Int. Cl.
*F16M 13/00* (2006.01)

(52) U.S. Cl. .......................... 248/636; 248/592; 248/562
(58) Field of Classification Search .................. 248/636, 248/562, 592, 49, 65, 74.1, 74.4; 52/167.1, 52/167.3, 167.4, 167.5, 167.6, 167.7, 167.8; 14/22, 23, 25, 19; 188/188, 378, 379, 380, 188/381; 267/136

See application file for complete search history.

(56) References Cited

U.S. PATENT DOCUMENTS

| | | | | |
|---|---|---|---|---|
| 4,995,583 | A * | 2/1991 | De La Fuente | 248/636 |
| 6,292,967 | B1 * | 9/2001 | Tabatabai et al. | 14/22 |
| 7,422,190 | B2 * | 9/2008 | Messein et al. | 248/636 |
| 2002/0104175 | A1 * | 8/2002 | Zivanovic et al. | 14/22 |
| 2003/0093869 | A1 * | 5/2003 | Petersen | 14/22 |
| 2007/0061982 | A1 * | 3/2007 | Lecinq et al. | 14/22 |
| 2011/0277252 | A1 * | 11/2011 | Stubler et al. | 14/22 |

* cited by examiner

*Primary Examiner* — Anita M King
*Assistant Examiner* — Eret McNichols
(74) *Attorney, Agent, or Firm* — Matthias Scholl P.C.; Matthias Scholl

(57) ABSTRACT

A damping device for a stay cable including a rotating lever, a lever support saddle, a longitudinal connecting member, and a rigid connection rod. When the stay cable vibrates inside or outside the plane thereof, the vibration displacement is transferred to the rotating lever through the rigid connection rod. One end of the rotating lever is connected to the lever support saddle via the longitudinal connecting member, and can rotate up and down with the lever support saddle as the axis and rotate around its central axis. The other end of the rotating lever is connected to a mass block and a damper. The damping device effectively inhibits vibrations inside and outside the stay cable plane, is easy to install and maintain, and does not negatively impact the appearance of a cable-stayed bridge.

4 Claims, 2 Drawing Sheets of# DAMPING DEVICE OF STAY CABLE

CROSS-REFERENCE TO RELATED APPLICATIONS

This application is a continuation of International Patent Application No. PCT/CN2010/077727 with an international filing date of Oct. 14, 2010, designating the United States, now pending, and further claims priority benefits to Chinese Patent Application No. 200910272400.7 filed Oct. 14, 2009. The contents of all of the aforementioned applications, including any intervening amendments thereto, are incorporated herein by reference.

BACKGROUND OF THE TECHNOLOGY

1. Field of the Invention

The invention relates to a damping device for vibration inhibition of a stay cable, especially for vibration inhibition of a stay cable in a large span cable-stayed bridge. It belongs to the field of damping technology of the engineering structure. Specifically, the invention relates to a damping device to restrain vibration of a stay cable in a cable-stayed bridge during the construction and operation.

2. Description of the Related Art

Conventional methods to make a connecting cable perpendicular to a stay cable and a lever (or bridge surface) is by using a fixed pulley, but it can only achieve an effective control of the vibration inside the stay cable plane, while the vibration outside the stay cable plane cannot be controlled. In addition, the connecting cable has a nonlinear structure, and the theoretically calculated parameters thereof have a big difference from the reality, which means an ideal damping effect cannot be acquired. The connecting cable always requires being pulled in use and hence has higher requirements on tension technology and weight of a heavy object during the installation. Furthermore, because the connecting cable requires the help of the pulley to change directions, thus a high rigidity for the pulley's fixing device is a must and thus results in large structural components size, which affects the bridge appearance.

SUMMARY OF THE INVENTION

One objective of the invention is to overcome the defects of the prior art and provide a rigid space lever mass damping device by using a rigid connection rod to connect a stay cable and a rotating lever and transfer the vibration displacement inside and outside the stay cable plane to the rotating lever. One end of the rotating lever is connected to a lever support saddle via a longitudinal connecting member. One end of the longitudinal connecting member is connected with the rotating lever by an ear fork connection mode to make the rotating lever rotate ups and downs with the lever support saddle as the axis. The other end of the longitudinal connecting member, being a cylinder, extends into a round hole of the lever support saddle to make the rotating lever rotate around its central axis. A friction ring and a high damping material are arranged between the cylinder of the longitudinal connecting member and the round hole in the upper portion of the lever support saddle. The other end of the rotating lever is connected with a mass block and a damper. When the stay cable vibrates inside or outside the plane thereof, the vibration displacement is transferred to the rotating lever through the rigid connection rod to drive the rotating lever, the mass block, and the damper to rotate around the lever central axis, and produce inertia force, elastic force, and damping force. When the stay cable vibrates outside the plane thereof, the friction and viscous force are provided through the friction ring and the high damping material, and then after the amplification effect of the rotating lever, the friction and viscous force are transferred back to the stay cable through the rigid connection rod to change the modal mass, stiffness, and damping of the stay cable. Therefore, the vibration inside and outside the stay cable planes is effectively inhibited. Because the main body of the damping device is located within bridge railings, it is installation and maintenance friendly and has small impacts on bridge appearance.

This objective is achieved as follows in accordance with the invention.

A rigid space lever mass damping device for a stay cable comprises a cable clamp 4', a rigid connection rod 5', a lever support saddle 6', a rotating lever 7', a mass block 8', a damper 9', a lever clip 12', and pin shafts 10', 11', 13', wherein an upper part of the rigid connection rod 5' is connected to a stay cable 1' through the cable clamp 4' and the pin shaft 10', and a lower part thereof is connected to the rotating lever 7' through the lever clip 12' and the pin shaft 11'. The damping effect is achieved by adjusting the connecting angle between the rigid connection rod 5' and the stay cable 1' and by adjusting the connection position of the lever clip 12' on the rotating lever 7'. One end of the rotating lever 7' is connected, through the pin shaft 13', to a longitudinal connecting member 14' that sticks into the lever support saddle 6' by means of an ear fork connection mode. The lever support saddle 6' fixed on a bridge deck 2' limits vertical movement of the longitudinal connecting member 14', which makes the rotating lever 7' rotate ups and downs around the pin shaft 13' mounted on the longitudinal connecting member 14' so as to receive the vibration displacement inside the stay cable 1' plane through the rigid connection rod 5'. As a segment of the longitudinal connecting member 14' sticking into the round hole of the lever support saddle 6' is a cylinder and the segment connecting with the rotating lever 7' is an ear plate shape, thus it makes the rotating lever 7' drive the cylinder of the longitudinal connecting member 14' to rotate around its central axis in the round hole of the lever support saddle 6' so as to receive the vibration displacement outside the stay cable 1' plane through the rigid connection rod 5; the other end of the rotating lever 7' is connected to the mass block 8' and damper 9' to provide the vibration-inhibition force.

The damper 9' installed between the rigid connection rod 5' and the bridge deck 2' is a passive or semi-active damper such as oil damper, viscous shearing damper, and magneto theological damper to provide the vibration-inhibition force.

A method using the rigid space lever mass damping device to adjust the damping effect is as follows: define the lever amplification coefficient $n=L_b/L_0$, wherein $L_0$ is distance from the lever clip 12' to the center of the pin shaft 13', $L_b$ is distance from the lever mass block 8' to the center of the pin shaft 13', $\alpha$ is an included angle between the rigid connection rod 5' and the stay cable 1', and $\beta$ is an included angle between the rigid connection rod 5' and the rotating lever 7'. Equivalent magnification of the vibration-inhibition force provided by the rotating lever 7' against the stay cable 1' is as follows $$n_{eqv.} = n^2 \sin^2 \alpha / \sin^2 \beta,$$

thus, factors influencing the stay cable's damping effect comprise: the installation location of the lever clip 12' on the rotating lever 7', the connection angle of the rigid connection rod 5' with the stay cable 1' and the rotating lever 7'. The closer the lever clip 12' to the pin shaft 13', the more perpendicular the rigid connection rod 5' to the stay cable 1', and the better the damping effect. In addition, since the weight of the mass block 8' and parameters chosen for the damper 9' can affect the inertia force, elastic force, and damping force, the damping effect of the stay cable 1' will be affected.

When the stay cable 1' vibrates inside the plane thereof, the vibration displacement is transferred to the rotating lever 7' through the rigid connection rod 5'. The rotating lever 7' drives the mass block 8' and the damper 9' to move ups and downs around the pin shaft 13' and produce the inertia force, the elastic force, and the damping force. After amplification effect of the rotating lever 7', the forces are transferred back to the stay cable 1' through the rigid connection rod 5' to change the modal mass, stiffness, and damping of the stay cable 1', thereby inhibiting the vibration of the stay cable 1'.

When the stay cable 1' vibrates outside the plane thereof, the vibration displacement is transferred to the rotating lever 7' through the rigid connection rod 5'. The rotating lever 7' drives the mass block 8', the damper 9', and the cylinder of the longitudinal connecting member 14' to rotate around the central axis of the rotating lever 7'. A high damping method is used for the junction plane between the lever support saddle 6' and the longitudinal connecting member 14'. The friction ring and high damping material arranged between the round hole inside of the lever support saddle 6' and the cylinder of the longitudinal connecting member 14' provide rotational friction and viscous force. The mass block 8' and the damper 9' provide the inertia force, the elastic force, and the damping force. After amplification effect of the rotating lever 7', the forces are transferred back to the stay cable 1' through the rigid connection rod 5' to change the modal mass, stiffness, and damping of the stay cable 1', thereby inhibiting the vibration of the stay cable 1'.

The rigid connection rod 5' can be adjusted in length and installed on the cable-stayed bridge during the construction stage to inhibit big vibration or wind and rain-induced vibration and ensure the safety of the bridge during the construction and operation.

The main body of the damping device used in the invention is mounted on the bridge; therefore it is installation friendly. As the main structure of the damping device has no relation to the angle of the stay cable, standardized design, manufacturing, and installation of the damper are easily achieved, thereby ensuring the manufacturing and installation quality as well as the damping effect. The mass block 8' of the damper can not only provide the inertial force to improve the damping effect systematically but also provide protection and heat preservation effects for the viscous material of the damper, thereby enhancing the durability of the damping device and the stability of the damping effect.

Advantages of the invention are summarized below:
1. The vibration inhibition inside and outside the stay cable planes are both considered and the damping effect is excellent.
2. The damping effect can be easily adjusted to achieve the best results conveniently.
3. The damping device can be applied in the vibration inhibition of the stay cable during the bridge construction and operation.
4. The damping device can realize the standardized design, manufacturing and installation of the damper conveniently.
5. The damping device is easy to install and maintain and has small influence on cable-stayed bridge appearance.

DETAILED DESCRIPTION OF THE EMBODIMENTS

The invention is explained in further detail below with the aid of the example and attached drawings. This example aims at a simulation test of the vibration inhibition of a cable-stayed bridge.

Figure 1:
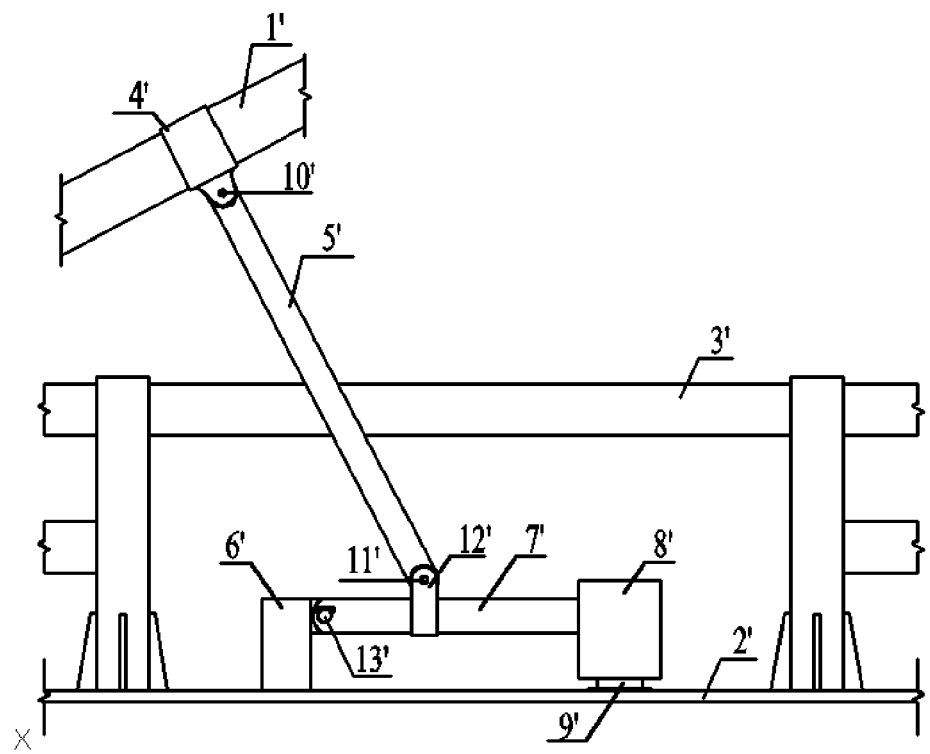
FIG. 1 is an elevation schematic diagram of a rigid space lever mass damping device according to one embodiment of the invention.
Figure 2:
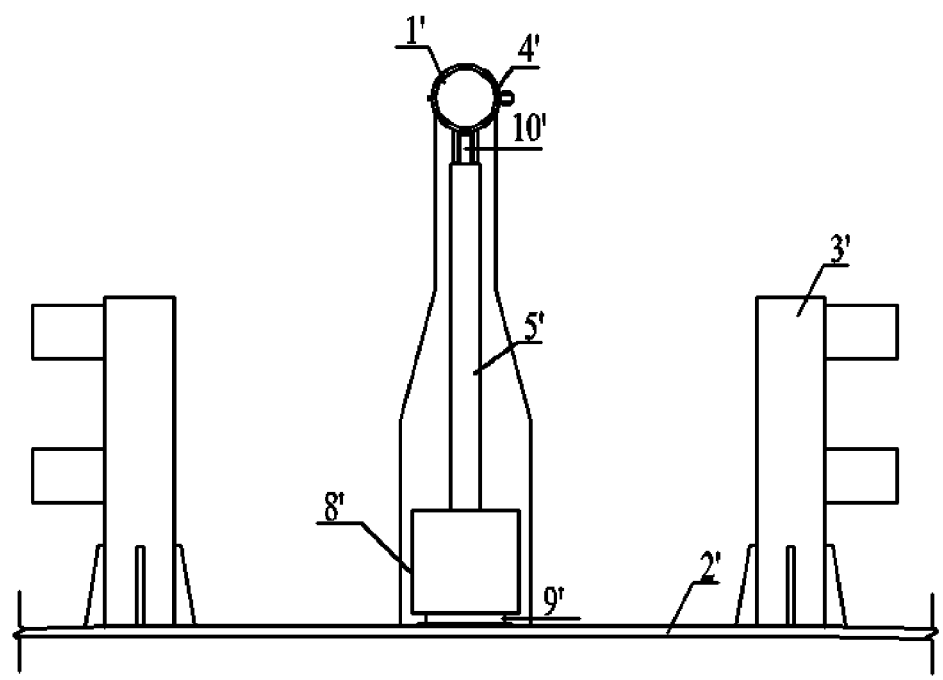
FIG. 2 is a side schematic diagram of a rigid space lever mass damping device according to one embodiment of the invention.

FIG. 1 is an elevation schematic diagram of a rigid space lever mass damping device of the invention, and FIG. 2 is a side schematic diagram of the rigid space lever mass damping device of the invention. A lever support saddle 6' is fixed on a main girder 2' of the cable-stayed bridge, a rotating lever 7' is supported on the lever support saddle 6' by the longitudinal connecting member through a pin shaft 13'; the rotating lever 7' can rotate ups and downs with the pin shaft 13' as the rotating axis and rotate around the central axis of the rotating lever 7'. One end of a rigid connection rod 5' is connected to a cable clamp 4' mounted on a stay cable 1' through a pin shaft 10', and the other end is connected to a lever clamp 12' of the rotating lever 7' through a pin shaft 11'. A damper 9' is arranged between a mass block 8' and the main girder 2'. When the stay cable 1' vibrates inside the plane thereof, the rigid connection rod 5' transfers the movement of the cable clamp 4' mounted on the stay cable 1' to the rotating lever 7' and cause the mass block 8' to produce the inertia force. At the same time because the movement of the damper 9' generates the damping force and elastic force, such forces are transferred from the rigid connection rod 5' to the stay cable 1' to inhibit vibration inside the stay cable 1' plane through the amplification effect of the rotating lever 7'. When the stay cable 1' vibrates outside the plane thereof, the rigid connection rod 5' drives the rotating lever 7' to rotate and control the rotation through the frictional resistance of the lever support saddle 6' and the inertia force, damping force and elastic force produced by the mass block 8' and the damper 9' so as to achieve the damping effect outside the stay cable plane. Since various angles can be easily realized through the pin shafts 10', 11' of the rigid connection rod 5', it make the design, manufacturing and installation of the main body of the damping device of the stay cables on different positions of the cable-stayed bridge meet standards. Because the lever support saddle 6', the rotating lever 7', the mass block 8' and the damper 9' are arranged within the rails, the appearance of the cable-stayed bridge will be hardly affected.

Figure 3:
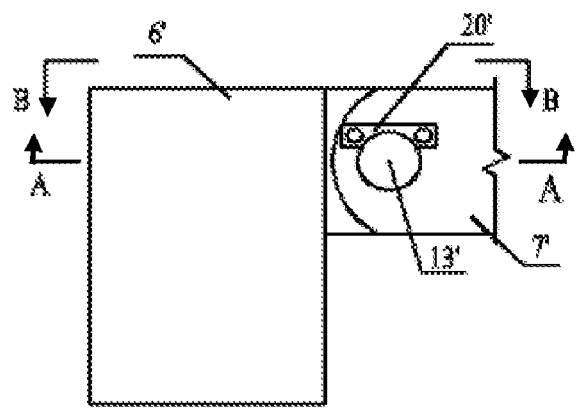
FIG. 3 is a schematic diagram of a connection structure of a lever support saddle and a rotating lever according to the embodiment of the invention.
Figure 4:
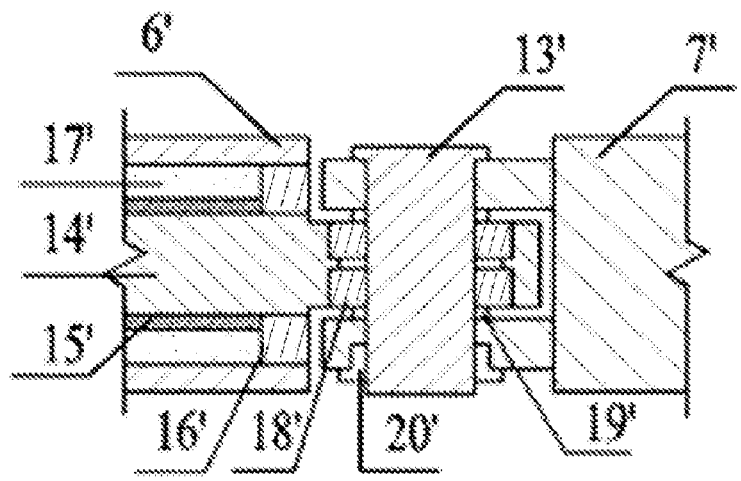
FIG. 4 is an sectional view of the connection structure of a lever support saddle and a rotating lever shown in FIG. 3 along line A-A according to the embodiment of the invention.
Figure 5:
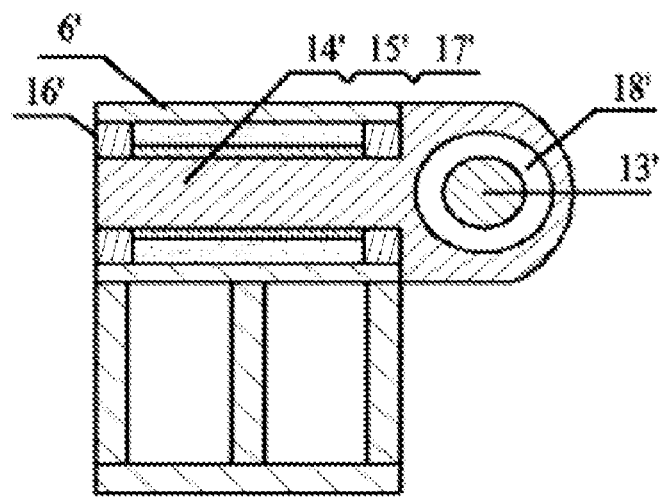
FIG. 5 is a sectional view of the connection structure of a lever support saddle and a rotating lever shown in FIG. 3 along line B-B according to the embodiment of the invention.

FIG. 3 is a schematic diagram of the connection structure of the lever support saddle and the rotating lever according to the embodiment of the invention, FIG. 4 is an A-direction sectional view of the connection structure of the lever support saddle and the rotating lever according to the embodiment of the invention, and FIG. 5 is a B-direction sectional view of the connection structure of the lever support saddle and the rotating lever according to the embodiment of the invention. A longitudinal connecting member 14' sticks into the round hole of the lever support saddle 6' with a bearing 16' and a friction ring 15' are arranged in the middle. Damping material 17' is filled between the friction ring 15' and the lever support saddle 6'. The other end of the longitudinal connecting member 14', arranged with the bearing 18', is connected to the rotating lever 7'. A retaining ring 19' facilitates positioning of the pin shaft 13', which is fixed on the rotating lever 7' through a pin shaft fixing device 20'. When the stay cable 1' vibrates inside the plane thereof, the rigid connection rod 5' drives the rotating lever 7' and internal equipment to rotate ups and downs around the pin shaft 13' with the aid of the damping force produced by the mass block 8' and the damper 9'. When the stay cable 1' vibrates outside the plane thereof, the rigid connection rod 5' drives the rotating lever 7' and the longitudinal connecting member 14' to rotate around their central axis. The friction resistance provided by the damping materials 17' arranged in the round hole of the lever support saddle 6' and the friction ring 15' during the rotation and the inertial force, damping force and elastic force produced by the mass block 8' and the damper 9' inhibit vibration outside the stay cable 1' plane.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A damping device for a stay cable, comprising:
   a) a cable clamp (4');
   b) a rigid connection rod (5');
   c) a lever support saddle (6');
   d) a rotating lever (7');
   e) a mass block (8');
   f) a damper (9');
   g) a lever clip (12'); and
   h) pin shafts (10'), (11'), (13');
   wherein
   an upper part of the rigid connection rod (5') is connected to a stay cable (1') through the cable clamp (4') and the pin shaft (10'), and a lower part thereof is connected to the rotating lever (7') through the lever clip (12') and the pin shaft (11'); the damping effect is controlled by adjusting a connecting angle between the rigid connection rod (5') and the stay cable (1') and by adjusting a connection position of the lever clip (12') on the rotating lever (7'); one end of the rotating lever (7') is connected, through the pin shaft (13'), to a longitudinal connecting member (14') that sticks into the lever support saddle (6') by means of an ear fork connection mode; the lever support saddle (6') fixed on a bridge deck (2') limits vertical movement of the longitudinal connecting member (14'), which makes the rotating lever (7') rotate ups and downs around the pin shaft (13') mounted on the longitudinal connecting member (14') so as to receive the vibration displacement inside the stay cable (1') plane through the rigid connection rod (5'); a segment of the longitudinal connecting member (14') sticking into the round hole of the lever support saddle (6') is a cylinder and the segment connecting with the rotating lever (7') is an ear plate shape, which makes the rotating lever (7') drive the cylinder of the longitudinal connecting member (14') to rotate around a central axis thereof in the round hole of the lever support saddle (6') so as to receive the vibration displacement outside the stay cable (1') plane through the rigid connection rod (5'); the other end of the rotating lever (7') is connected to the mass block (8') and damper (9') to provide vibration-inhibition force;

when the stay cable (1') vibrates inside the plane thereof, the vibration displacement is transferred to the rotating lever (7') through the rigid connection rod (5'); the rotating lever (7') drives the mass block (8') and the damper (9') to move ups and downs around the pin shaft (13') and produce the inertia force, the elastic force, and the damping force; after amplification effect of the rotating lever (7'), the forces are transferred back to the stay cable (1') through the rigid connection rod (5') to change the modal mass, stiffness, and damping of the stay cable (1'), thereby inhibiting the vibration of the stay cable (1');

when the stay cable (1') vibrates outside the plane thereof, the vibration displacement is transferred to the rotating lever (7') through the rigid connection rod (5'), the rotating lever (7') drives the mass block (8'), the damper (9'), and the cylinder of the longitudinal connecting member (14') to rotate around the central axis of the rotating lever (7'); a high damping combination between the lever support saddle (6') and the longitudinal connecting member (14') provides rotational friction and viscous force; the mass block (8') and the damper (9') provide the inertia force, the elastic force, and the damping force; after amplification effect of the rotating lever (7'), the forces are transferred back to the stay cable (1') through the rigid connection rod (5') to change the modal mass, stiffness, and damping of the stay cable (1'), thereby inhibiting the vibration of the stay cable (1').

2. The device of claim 1, wherein the damping effect of the stay cable (1') is determined by the amplification effect of the rotating lever (7') on the inertia force, the elastic force, the damping force, the rotational friction, and the viscous force; to define the lever amplification coefficient $n=L_b/L_0$, wherein $L_0$ is distance from the lever clip (12') to the center of the pin shaft (13'), $L_b$ is distance from the lever mass block (8') to the center of the pin shaft (13'), $\alpha$ is an included angle between the rigid connection rod (5') and the stay cable (1'), and $\beta$ is an included angle between the rigid connection rod (5') and the rotating lever (7'); equivalent magnification of the vibration-inhibition force provided by the rotating lever (7') against the stay cable (1') is as follows:

$$n_{eqv.} = n^2 \sin^2\alpha / \sin^2\beta,$$

thus, factors influencing the stay cable's damping effect comprise: the installation location of the lever clip (12') on the rotating lever (7'), a connection angle of the rigid connection rod (5') with the stay cable (1') and the rotating lever (7'); the closer the lever clip (12') to the pin shaft (13'), the more perpendicular the rigid connection rod (5') to the stay cable (1'), and the better the damping effect.

3. The device of claim 1, wherein the damper (9') installed between the rigid connection rod (5') and the bridge deck (2') is an oil damper, viscous shearing damper, or a magneto theological damper to provide the damping force.

4. The device of claim 1, wherein a friction ring and a high damping material are arranged between the cylinder of the longitudinal connecting member (14') and the round hole of the lever support saddle (6') to provide rotational friction and viscous force.

* * * * *